US009994093B2

(12) United States Patent
Rikkert et al.

(10) Patent No.: US 9,994,093 B2
(45) Date of Patent: Jun. 12, 2018

(54) GUIDE AND SUNSHADE ASSEMBLY PROVIDED THEREWITH

(71) Applicant: Inalfa Roof Systems Group B.V., Venray (NL)

(72) Inventors: Robert Rikkert, Nuenen (NL); Theodorus Van Doleweerd, Budel-Dorpplein (NL); Paulus Johannes Wilhelmus Munsters, Uden (NL); Petrus Martinus Josephus Clephas, Sevenum (NL)

(73) Assignee: INALFA ROOF SYSTEM GROUP B.V., Oostrum (NL)

( * ) Notice: Subject to any disclaimer, the term of this patent is extended or adjusted under 35 U.S.C. 154(b) by 0 days. days.

(21) Appl. No.: 14/826,794

(22) Filed: Aug. 14, 2015

(65) Prior Publication Data
US 2016/0185194 A1    Jun. 30, 2016

(30) Foreign Application Priority Data
Aug. 18, 2014    (EP) .................................... 14181244

(51) Int. Cl.
*B60J 3/00* (2006.01)
*B60J 7/00* (2006.01)
(Continued)

(52) U.S. Cl.
CPC ............. *B60J 7/003* (2013.01); *B60J 1/2052* (2013.01); *B60J 7/0015* (2013.01); *E06B 9/581* (2013.01)

(58) Field of Classification Search
CPC ........ B60J 7/0015; B60J 1/2052; E06B 9/581
(Continued)

(56) References Cited

U.S. PATENT DOCUMENTS 4,610,293 A * 9/1986 Weiblen ..................... E06B 7/02
160/120
4,649,981 A * 3/1987 Bibeau ..................... E06B 9/581
160/120
(Continued)

FOREIGN PATENT DOCUMENTS

DE    102005040758    3/2007
EP          2151339    2/2010
(Continued)

OTHER PUBLICATIONS

Communication and European Search Report for corresponding foreign application No. EP14181244, filed Aug. 18, 2014.

*Primary Examiner* — Katherine W Mitchell
*Assistant Examiner* — Abe Massad
(74) *Attorney, Agent, or Firm* — Steven M. Koehler; Westman, Champlin & Keohler, P.A.

(57) ABSTRACT

A guide is presented intended for use in a sunshade assembly of the type comprising a flexible sunscreen having opposed longitudinal edges and two opposed longitudinal guides each comprising at least two spaced guide legs for defining there between a guide channel for receiving therein and guiding corresponding ones of the opposed longitudinal edges of the sunscreen. The guides and longitudinal edges are provided with cooperating guide locking members and edge locking members for preventing the longitudinal edges of the sunscreen from moving out of the guide channels. The guide locking members are defined on separate parts engaging the guides.

16 Claims, 10 Drawing Sheets

(51) Int. Cl.
  *B60J 1/20* (2006.01)
  *E06B 9/58* (2006.01)
(58) Field of Classification Search
  USPC .......................... 160/370.22, 273.1; 296/219
  See application file for complete search history.

(56) References Cited

U.S. PATENT DOCUMENTS

| | | | |
|---|---|---|---|
| 5,526,865 A * | 6/1996 | Coenraets | E06B 9/58 160/272 |
| 6,119,758 A * | 9/2000 | Coenraets | E04H 4/101 160/273.1 |
| 6,957,850 B2 * | 10/2005 | Breuer | B60J 7/0015 296/214 |
| 6,968,887 B2 * | 11/2005 | Hansen | B60J 1/2027 160/280 |
| 6,991,761 B2 | 1/2006 | Hehenberger | |
| 7,389,807 B2 * | 6/2008 | Nagare | E06B 9/13 160/268.1 |
| 7,744,151 B2 | 6/2010 | Jansen | |
| 7,793,702 B2 * | 9/2010 | Biewer | B60J 7/0007 160/272 |
| 7,798,568 B2 | 9/2010 | Keller | |
| 8,602,081 B2 * | 12/2013 | Komatsu | E06B 9/13 160/273.1 |
| 8,607,841 B2 * | 12/2013 | Hayashiguchi | E06B 9/581 160/273.1 |
| 2005/0045287 A1 | 3/2005 | Hansen | |
| 2007/0205636 A1 | 9/2007 | Gonzalez Merino | |
| 2008/0179021 A1 | 7/2008 | Biewer | |
| 2008/0216971 A1 | 9/2008 | Rockelmann | |
| 2009/0014555 A1 | 1/2009 | Litvinov | |
| 2009/0145559 A1 | 6/2009 | Glasl | |
| 2010/0032991 A1 | 2/2010 | Keller | |
| 2010/0170645 A1 | 7/2010 | Lin | |
| 2011/0056632 A1 | 3/2011 | Thalhammer | |
| 2011/0100570 A1 * | 5/2011 | Licciardi Di Stefano | E06B 9/42 160/368.1 |
| 2011/0227371 A1 * | 9/2011 | Nellen | B60J 7/0015 296/216.04 |

FOREIGN PATENT DOCUMENTS

| | | |
|---|---|---|
| JP | H11141250 | 5/1999 |
| WO | 2006053520 | 5/2006 |

* cited by examiner

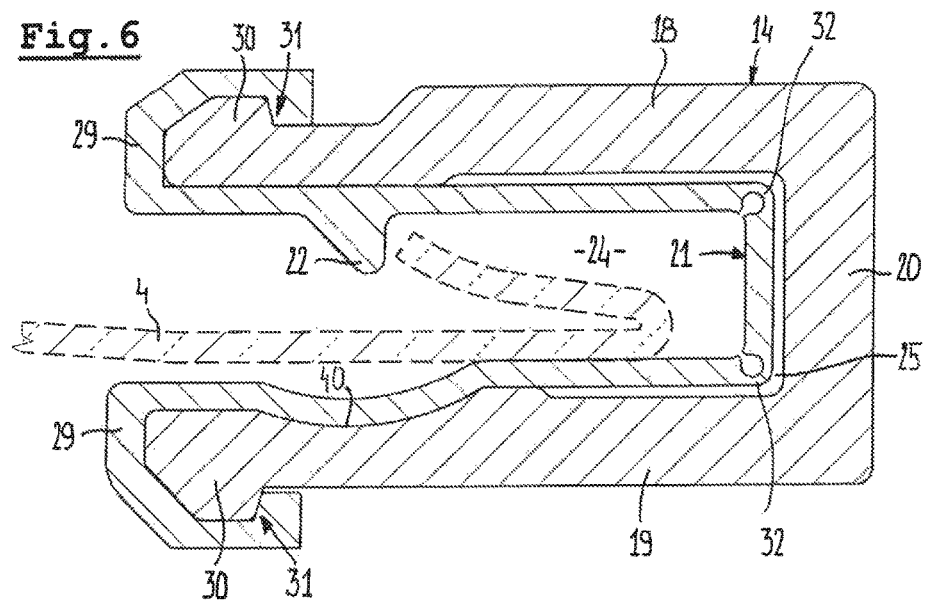
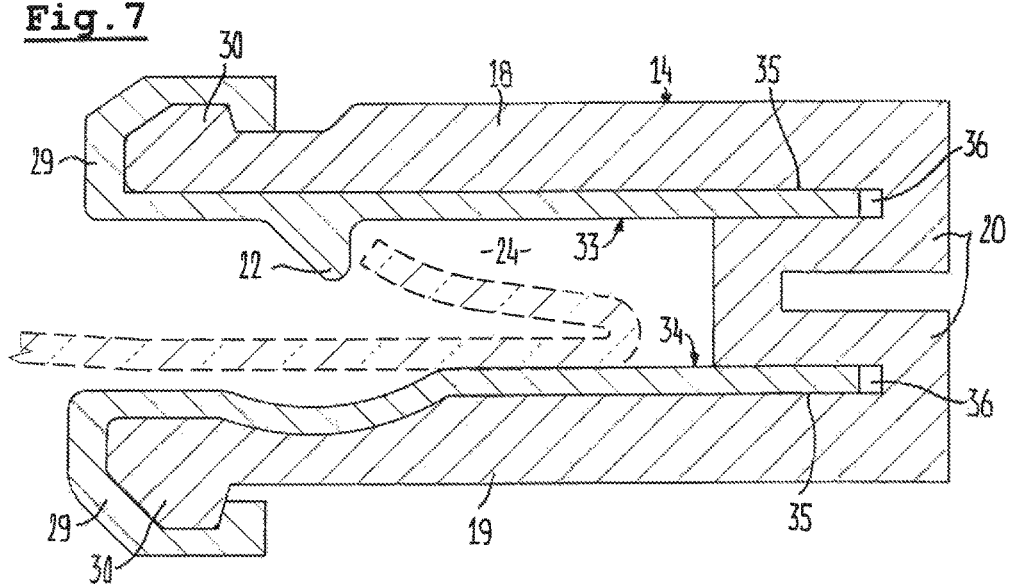

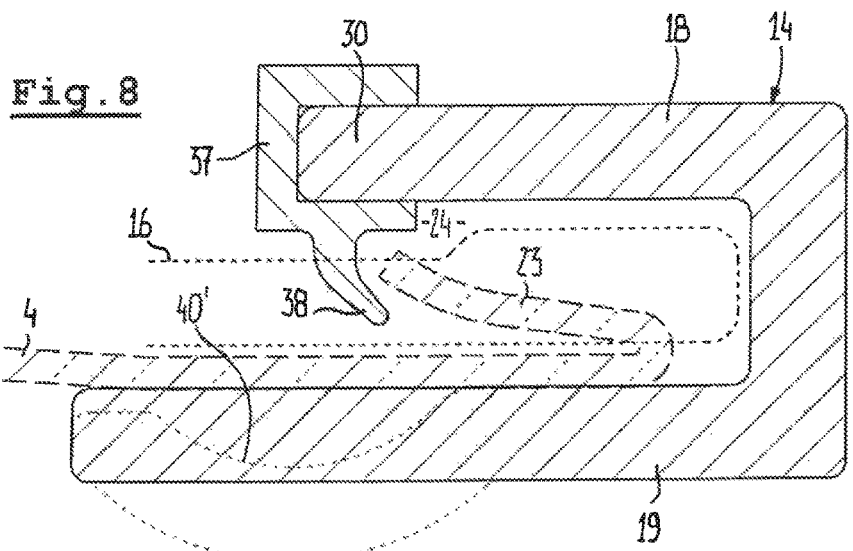
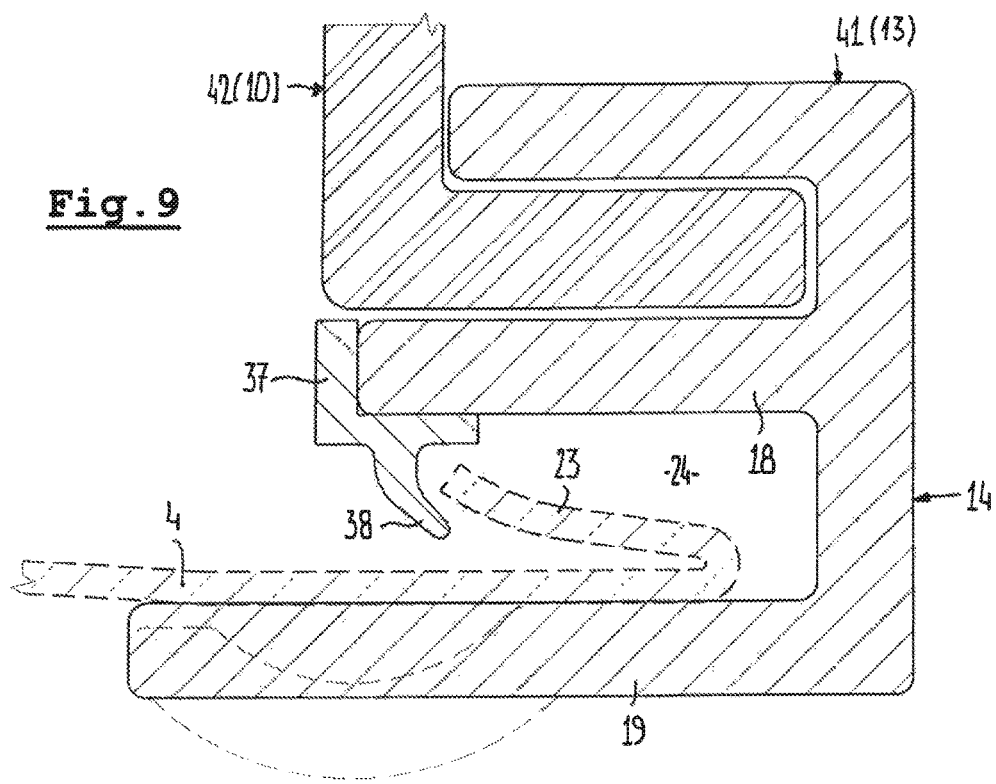

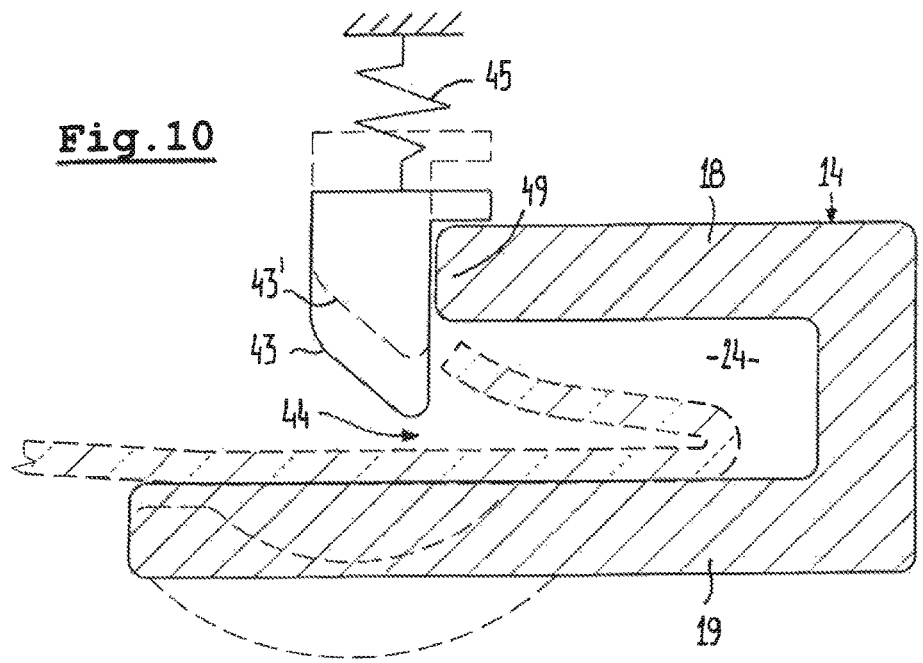
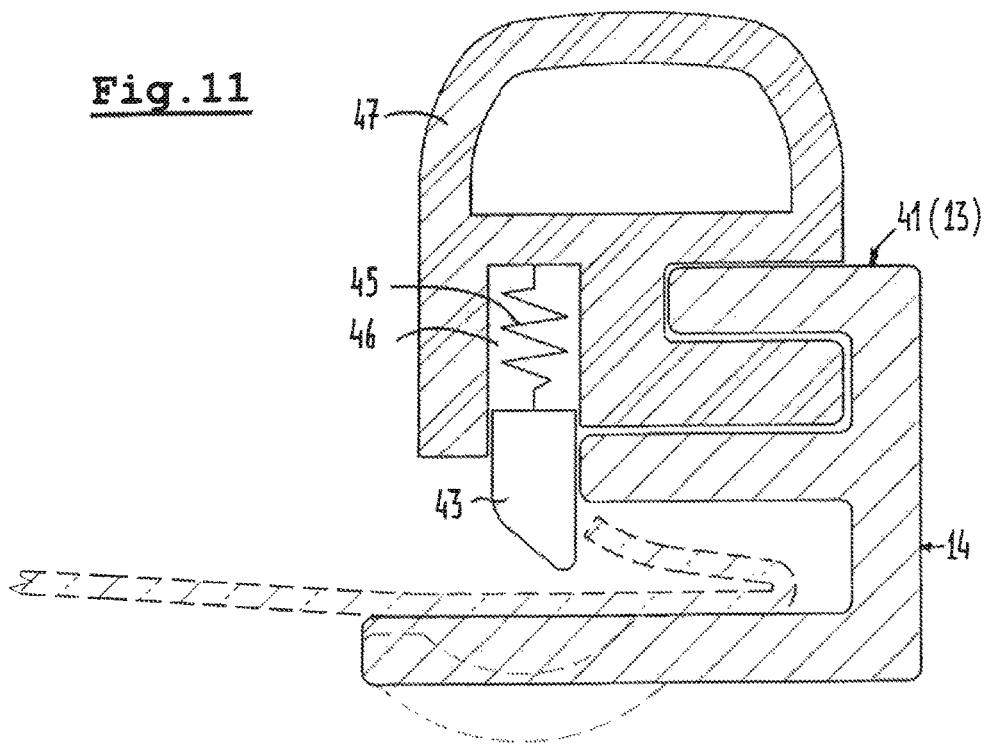

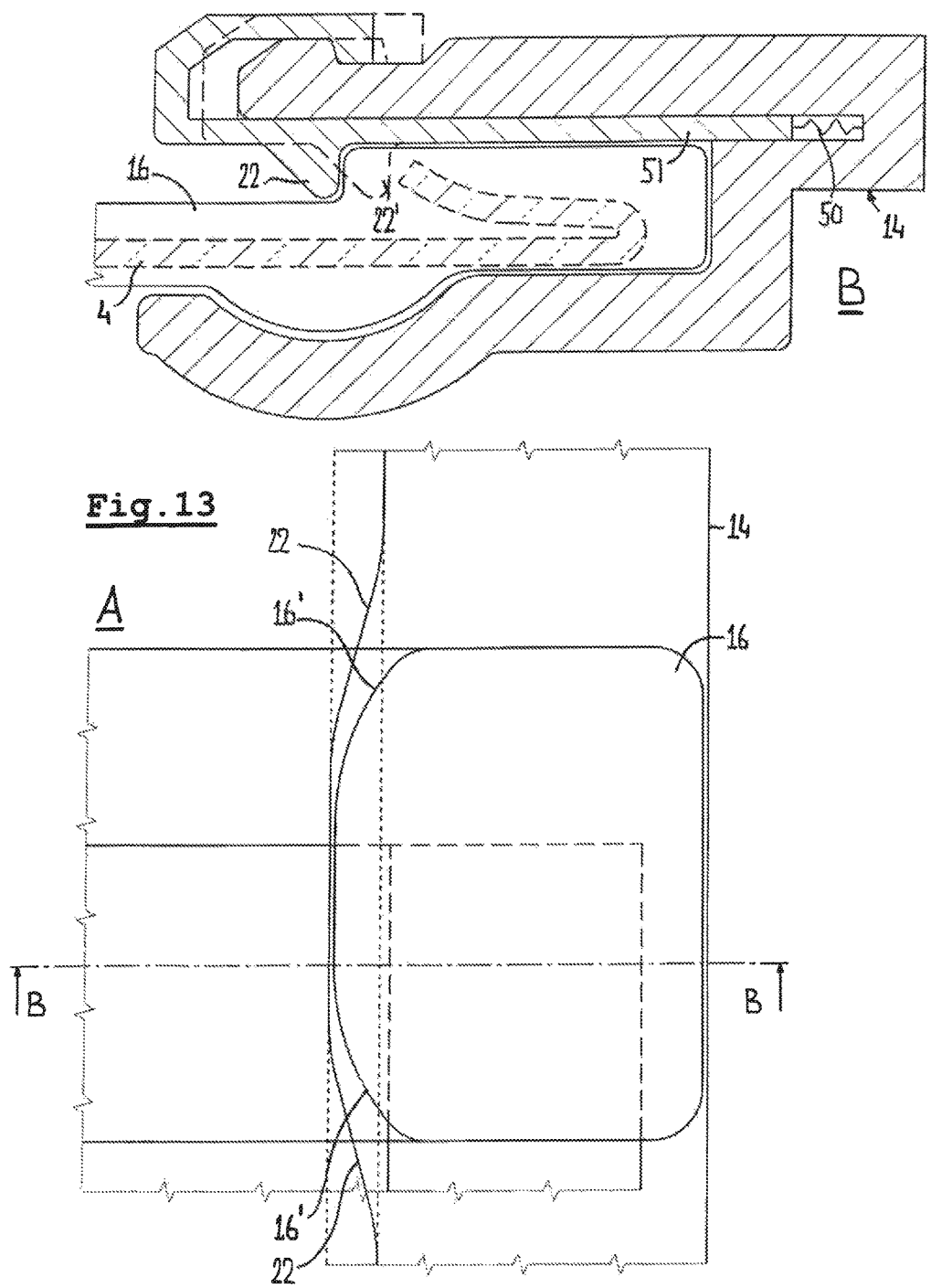

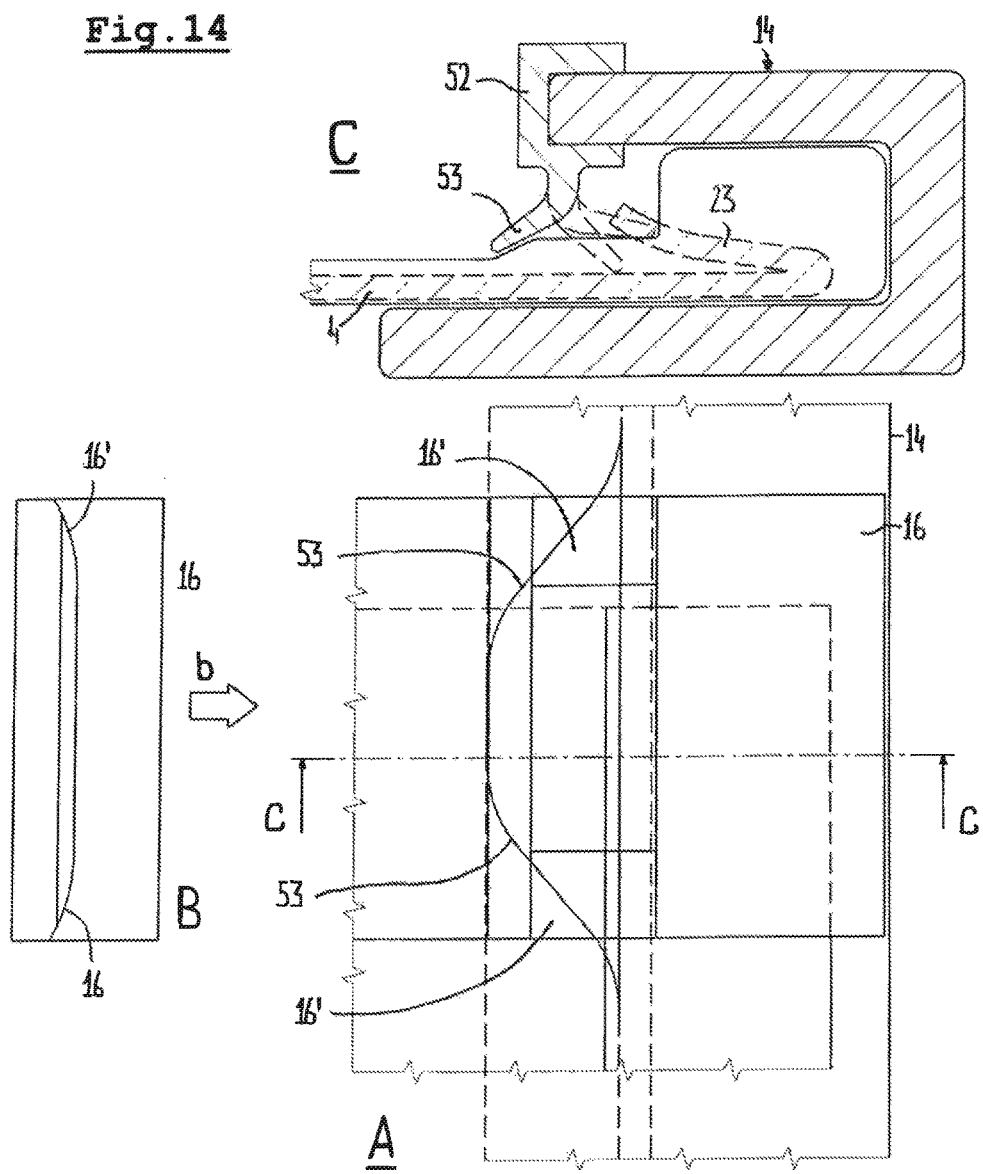

GUIDE AND SUNSHADE ASSEMBLY PROVIDED THEREWITH

BACKGROUND

The discussion below is merely provided for general background information and is not intended to be used as an aid in determining the scope of the claimed subject matter.

Aspects of the invention relate to a guide intended for use in a sunshade assembly of the type comprising a flexible sunscreen having opposed longitudinal edges; two opposed longitudinal guides each comprising at least two spaced guide legs for defining there between a guide channel for receiving therein and guiding corresponding ones of the opposed longitudinal edges of the sunscreen; wherein the guides and longitudinal edges are provided with cooperating guide locking members and edge locking members for preventing the longitudinal edges of the sunscreen from moving out of the guide channels.

In some state of the art guides of this type the cooperation between the guide locking members (for example a ridge extending from one of the guide legs into the guide channel) and edge locking members (for example an inwardly folded part of the longitudinal edge of the sunscreen engaging behind and locking to said ridge) not always may prevent that a longitudinal edge comes out of the guide (that means that such a guide cannot withstand a sufficient high level of lateral pull out force acting on the sunscreen). This problem, among others, may be caused by the size of the entrance opening of the guide channel. One solution would be to reduce such size, but in some embodiments this is not possible because also other larger dimensioned members (other than the sunscreen's longitudinal edges) are guided in the guide channel. Further, reducing the size of the entrance opening (or of other parts of the guide) can cause problems with tools used to manufacture such a guide (for example an extrusion tool, when used, then would be prone to premature collapse), whereas further due to wear of manufacturing tools it is very difficult (or nearly impossible) to maintain the dimensions of the guide, thus leading to an end product (guide) with properties which vary in an unpredictable manner.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the invention is to provide an improved guide of the above type.

According to an aspect of the invention the guide is characterized in that the guide locking members are defined on separate parts engaging the guides. The separate parts can be made of a material (for example plastic material) best fit for guiding the sunscreen (and, optionally, other parts) in view of, among others, sliding force and noise level, while still allowing the guide (the guide legs) to be manufactured from a material offering sufficient strength and rigidity (for example a metal such as aluminium). The dimensions of such parts do not vary much during prolonged manufacture (contrary to manufacturing (metal) guides) and this will lead to a more constant resultant level of the pull out force.

In one embodiment each part for its major part is positioned between the guide legs. This means that the part defines an insert positioned in the guide, which insert then defines the guide channel. Such an insert may be manufactured apart from the guide (guide legs) and afterwards be combined therewith. It is, however, also possible to manufacture these parts in a combined manner at the same time (for example using a two-step moulding process).

Preferably each part at least partially is spaced from the guide. This allows the design to cope with varying dimensions of the guide (guide legs) as a result of varying circumstances during the manufacture thereof (as discussed with respect to the state of the art).

Thus in a preferred embodiment of the guide the guide legs are connected by a guide bottom and the part is spaced from said guide bottom and at least partially is spaced from the guide legs and is connected to said guide legs only at the ends of said guide legs remote from the guide bottom.

In such a case at least one of the guide legs at its free end may be provided with a protrusion for engagingly locking the part in the guide. As a result the part is safely received in the guide (between the guide legs) without the risk of coming out of the guide As an alternative the part may be provided with shaped ends for enclosing the ends of the guide legs remote from the guide bottom. In such a case the shaped ends and ends of the guide legs may be provided with cooperating snapping members maintaining the part in its position relative to the guide.

In another embodiment of the guide the guide legs are connected by a guide bottom and the part is attached to said guide bottom, wherein at least one of the guide legs at its free end is provided with a protrusion for locking the part in the guide and wherein the protrusion is spaced from the part. The spacing between the protrusion and part allows to cope with different dimensions of the guide due to manufacturing.

In such a case the guide bottom may be provided with at least one opening wherein the part is provided with a locking part extending through and locking to said opening. For example, such a locking part may be a pin with an enlarged head moulded (or otherwise attached) to the part.

When both guide legs are provided with such a protrusion, the position of the part may be controlled very effectively.

Whereas in the previous embodiments the part generally defines a single part, it is also conceivable that the guide is provided with two separate parts attached to different ones of the guide legs.

In such a case it is possible that the guide legs are connected by a guide bottom in which two recesses are provided for receiving each a first end of a corresponding one of the two separate parts, wherein an opposite second end of said parts is provided with a shaped end for enclosing the free end of the corresponding guide leg remote from the guide bottom. The cooperation between the first ends of the parts and the recesses in the guide bottom, at one hand, and the cooperation between the shaped ends of the parts and the free ends of the guide legs, at the other hand, results in a stable position of the parts relative to the guide (guide legs).

In one embodiment the two separate parts are attached to the respective guide legs in a manner to be movable in parallel and relative thereto against the bias of a biasing member. As a result these parts may move during the passage of a larger dimensioned part (for example an operating beam or a positioning member described below).

The guide also may be provided with a single part attached to one of said guide legs in a manner to be movable in parallel and relative thereto against the bias of a biasing member.

In most cases the part(s) and guide (guide legs) are attached to each other as a result of their shapes or using additional fasteners. In an alternative embodiment, however, the part defines a member connected to a free end of one of the guide legs by means of a 2K moulding process.

In accordance with another embodiment of the guide, each guide locking member defines a flexible lip protruding into the guide channel for defining an entrance opening into the guide channel, and capable of bending in an inward or outward direction of the guide channel to a position with enlarged entrance opening. The movement of the flexible lip with resulting enlargement of the entrance opening of the guide channel allows the passage of a member in the guide channel having larger dimensions than the sunscreen (for example an operating beam or a positioning member described below). A resistance against such a movement of such a flexible lip prevents the longitudinal edges of the sunscreen from coming out of the guide channel.

In yet another embodiment of the guide one of the guide legs is shorter than the opposite guide leg wherein the part is positioned in front of a free end of the shorter one of the guide legs for defining an entrance opening into the guide channel between it and the longer guide leg, which part is movable in a direction substantially perpendicularly to said guide leg for enlarging the entrance opening and is biased in a direction for decreasing the entrance opening. For example, such a movable part may be received in a recess in a seal member positioned alongside, or attached to the guide.

The guide may be attached to, or integrated into an open roof construction for a vehicle. For example it may be part of a main guide for a moving mechanism of such an open roof construction.

Preferably at least one of the parts is made of plastic, without however excluding the use of other materials (for example aluminium). Plastic will be preferred when the part (or a section thereof) has to be resilient or deformable.

In a second aspect the present invention relates to a sunshade assembly comprising a flexible sunscreen having opposed longitudinal edges and opposed transversal edges, two opposed longitudinal guides in accordance with specific embodiments of the invention, and an operating beam connected to a first one of said transversal edges and provided with positioning members for cooperation with inwardly folded wings of the longitudinal edges of the sunscreen, which positioning members are attached to and extend from the operating beam into corresponding ones of said longitudinal guides and are movable with the operating beam for again positioning the longitudinal edges of the sunscreen into the longitudinal guides after coming out of said guides, which positioning members have guide edges for engaging and moving the parts for temporarily enlarging the entrance opening of the guide channel during passage of the positioning members.

BRIEF DESCRIPTION OF THE DRAWINGS

Hereinafter aspects of the invention will be elucidated while referring to the drawings in which:

FIGS. 4-12 show, on an enlarged scale, schematic cross sections of a number of different embodiments of a guide, and FIGS. 13 and 14 illustrate the use of embodiments of a positioning member.

DETAILED DESCRIPTION OF THE ILLUSTRATIVE EMBODIMENTS

Figure 1:
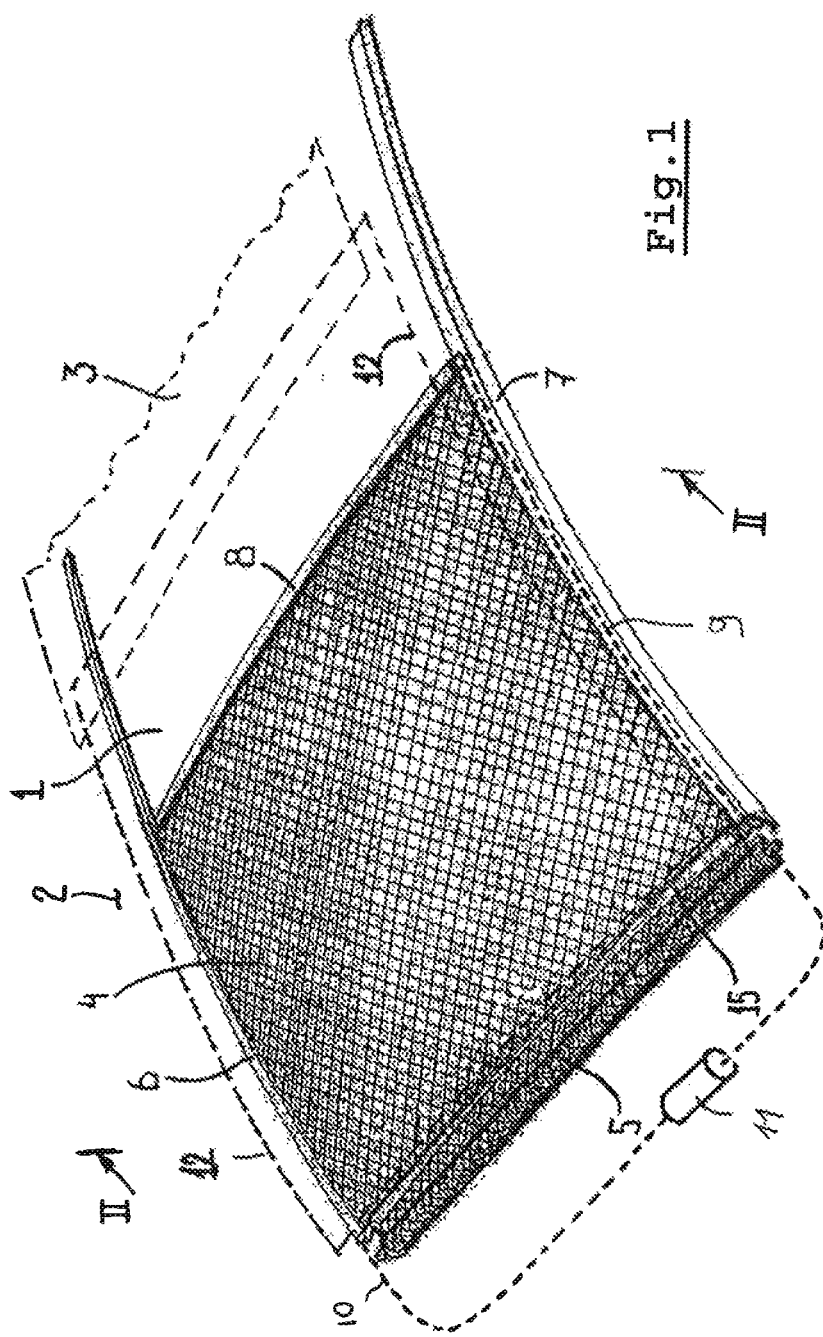
FIG. 1 shows, schematically and in a perspective view, a sunshade assembly applied to an open roof construction.
Figure 2:
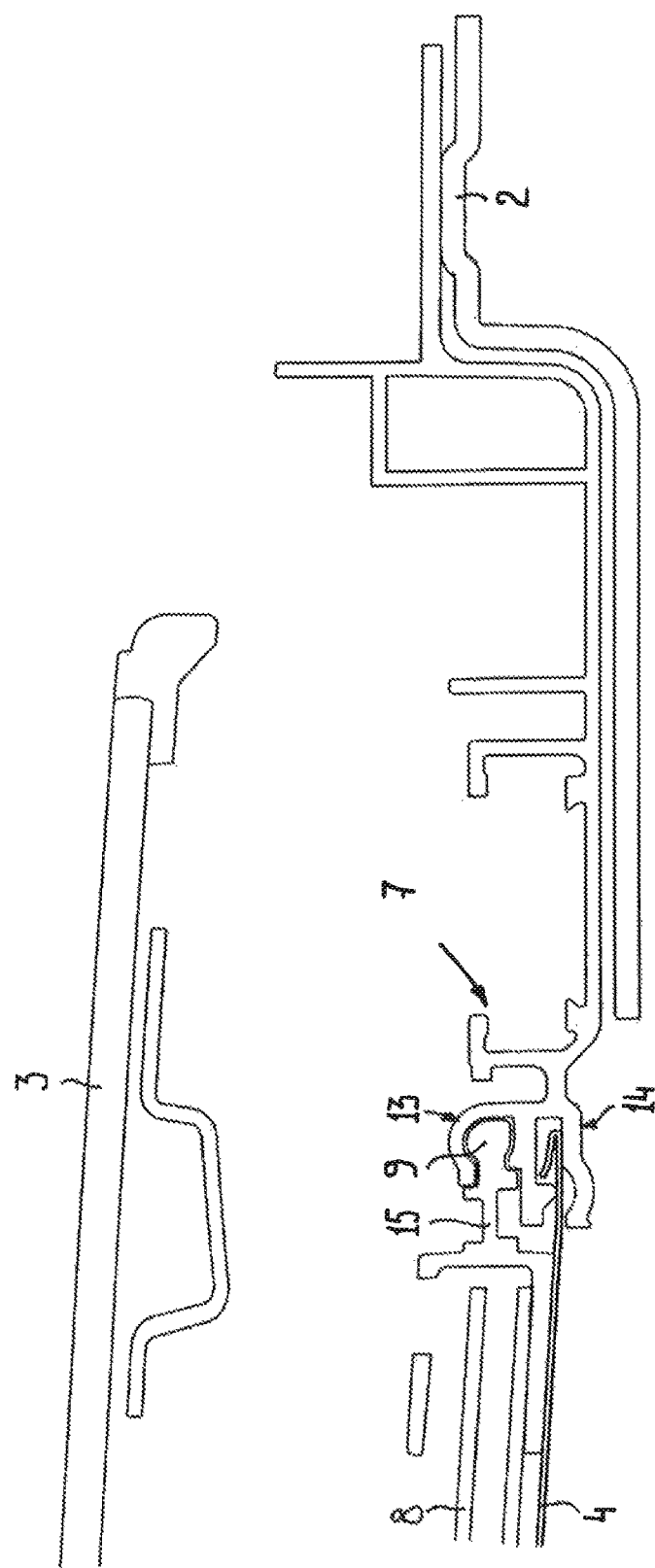
FIG. 2 shows, schematically and in a transverse cross section, a detail of the sunshade assembly.
Figure 3:
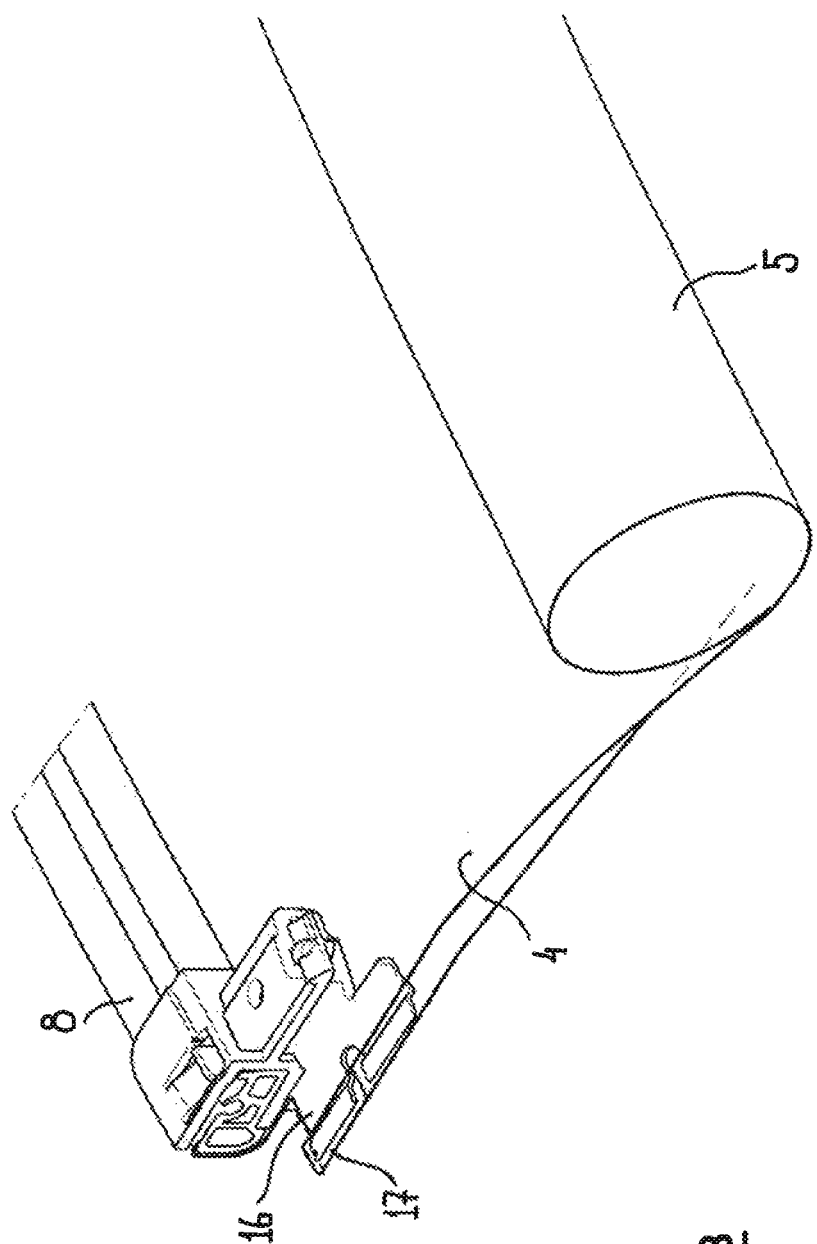
FIG. 3 shows, schematically and in a perspective view, a part of the sunshade assembly for illustrating its operation.

Firstly referring to FIGS. 1-3, an example is illustrated of an open roof construction for a vehicle having a roof assembly and comprising a sunscreen assembly in which guides may be incorporated. Said roof assembly is for opening and closing a roof opening 1 in a stationary roof part 2 of the vehicle and includes a movable closure panel 3 which, by means not illustrated in detail but known per se, can be moved for opening and closing said roof opening 1. Commonly, as is known, the movable panel 3 is guided in longitudinal guides mounted in or formed in the stationary roof part 2 along longitudinal sides 12 of the roof opening 1. A user operated device such as a motor or crank (not illustrated) is operably coupled to the panel 3 via cables or the like to move the panel 3 selectively between its open and closed positions. In FIG. 1 the closure panel 3 has been illustrated in a position in which it opens the roof opening 1.

Below the roof opening 1 a sunshade assembly is positioned. Basically, said sunshade assembly comprises a flexible sunscreen 4, a rotatable winding shaft 5 for winding and unwinding the sunscreen 4 at a first transversal edge and two opposite longitudinal guide assemblies 6 and 7. The guide assemblies 6, 7 can be connected to or formed integral from a single unitary body with the guides of the closure panel (not illustrated). Likewise, the guide assemblies 6, 7 can be separate from the guides of the panel 3. Drive members may be provided, which in FIG. 1 have been illustrated schematically by dotted lines 9, 10. As is known per se, the drive members may comprise longitudinal members driven by an actuator 11 for a reciprocating movement for winding and unwinding the sunscreen 4.

Each drive member 9, 10 is connected to an operating beam 8 provided at and connected to a transversal edge of the sunscreen 4 remote from the winding shaft 5. Although the reciprocating movement of the sunscreen 4 primarily is generated by the reciprocating movement of the drive members 9 and 10 as caused by the actuator 11, it is possible too that in addition the winding shaft 5 is preloaded in a sense for winding the sunscreen 4 thereon. Further it should be noted that the movement of the sunscreen 4 also may be initiated manually.

Now, reference is made to FIG. 2 which schematically illustrates a transverse cross section according to II-II in FIG. 1 (it is noted that only the right half of the cross section is shown, the left half being a mirror image thereof). FIG. 2 shows the panel 3, right guide assembly 7 (attached to the stationary roof part 2) and operating beam 8. The sunscreen 4 is attached to the operating beam 8 in a manner known and not further elucidated here.

The guide assembly 7, in the illustrated embodiment, comprises an upper guide 13 and a lower guide 14. The operating beam 8 has attached to its outer end a mounting part 15 which protrudes into the upper guide 13 and which is connected therein to drive member (e.g. cable) 9. Thus, the operating beam 8 comprises opposite lateral ends each extending into a corresponding upper guide 13 and being guided therein. The corresponding longitudinal edge of the sunscreen 4 will be guided in the lower guide 14.

A positioning member 16 (illustrated in FIG. 3) is attached to the operating beam 8 and extends into, and is guided by, lower guide 14. A wing 17 of the sunscreen 4 is folded around said positioning member 16.

Referring to FIG. 3, part of the operating beam 8 near its left end is shown. The guide assembly 7 with upper guide 13 and lower guide 14 have been omitted in this view to more clearly show the positioning member 16. From FIG. 3 it appears that the wing 17 of the sunscreen 4 gradually unfolds in a direction towards the winding shaft 5. When, in a fully or partially closed position of the sunscreen 4, a longitudinal edge thereof comes out of the lower guide 14, the position thereof can be restored by fully opening the sunscreen (winding it onto the winding shaft 5) and again moving it to a (partially) closed position. The wing 17 extending around the lip 16 will take care of again positioning the longitudinal edge of the sunscreen into the corresponding lower guide 14.

FIGS. 4-12 show, in a schematic cross section, embodiments of the lower guide 14 intended for application in a sunshade assembly of the type described above. It is noted, however, that the use of the guide is not limited to such applications, but that its field of application is much wider (and also could extend beyond the automotive field). As will be described below, such guides generally comprise at least two spaced guide legs for defining there between a guide channel for receiving therein and guiding corresponding ones of the opposed longitudinal edges of a sunscreen. Further the guides and longitudinal edges are provided with cooperating guide locking members and edge locking members for preventing the longitudinal edges of the sunscreen from moving out of the guide channels.

Figure 4:
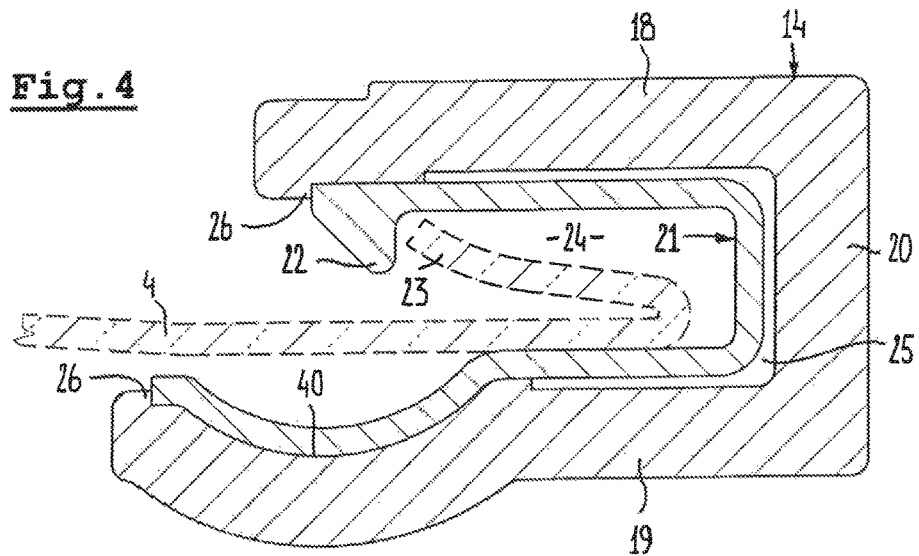

Specifically referring to FIG. 4, a guide 14 (preferably made of a metal such as aluminium) is illustrated comprising an upper guide leg 18 and a lower guide leg 19, which at an inner end are connected by a guide bottom 20. A part or insert 21 (in this embodiment made of plastic material) is positioned between the upper guide leg 18 and lower guide leg 19. This plastic part 21 is provided with a ridge or projection 22 acting as guide locking member for cooperation with an inwardly folded part 23 of a longitudinal edge of the sunscreen 4 (illustrated in broken lines in this figure) and acting as edge locking member for preventing the longitudinal edges of the sunscreen 4 from moving out of a guide channel 24 defined within the plastic part 21. Thus, the guide locking members (ridges or projections) 22 are defined on a separate plastic part 21 engaging the guide 14, and not on the guide 14 itself.

As viewed in the longitudinal direction of the guide 14, one single plastic part 21 may be applied extending over the entire length of the guide 14, but as an alternative a number of adjacent plastic part sections may be used too.

The plastic part 21 is spaced from the guide bottom 20 and at least partially is spaced from the upper and lower guide legs 18,19 (for defining a free space 25). Further the plastic part 21 is connected to said upper and lower guide legs 18,19 only at the ends thereof remote from the guide bottom 20. In this embodiment the guide legs 18,19 at their free ends are provided with a protrusion 26 for engagingly locking the plastic part 21 in the guide 14.

Figure 5:
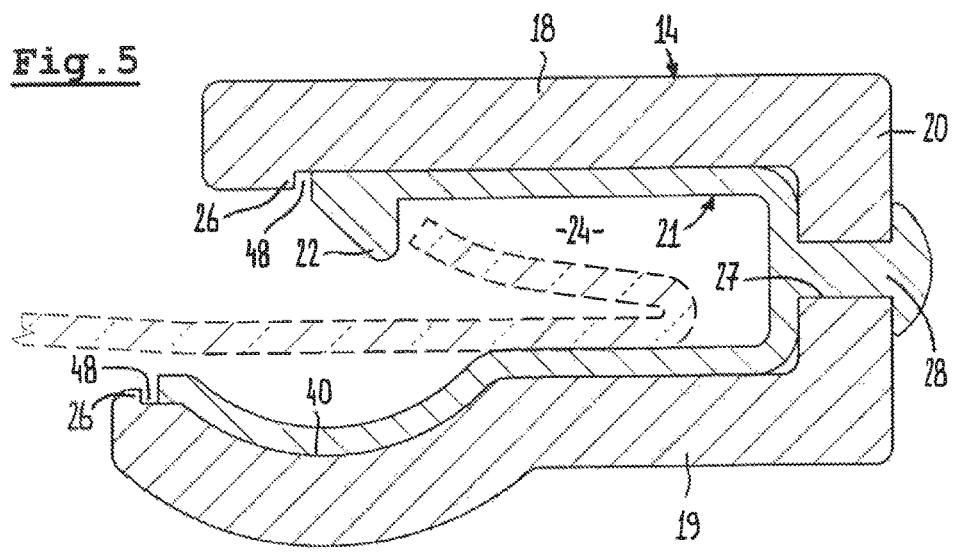

In FIG. 5 an embodiment of the guide 14 is illustrated in which the plastic part 21 is attached to the guide bottom 20 (which for that reason is provided with an opening 27, wherein the plastic part 21 is provided with a locking part or pin 28 with enlarged head extending through and locking to said opening 27). In this embodiment the protrusions 26 are spaced from the plastic part 21 (spacing 48) for allowing to cope with production tolerances of the guide 14 (for example as a result of wear of a manufacturing tool).

Now referring to FIG. 6, an embodiment of the guide 14 is shown with a plastic part or insert 21 that is provided with shaped or bent ends 29 for enclosing the free ends 30 of the upper and lower guide legs 18,19 remote from the guide bottom 20. For securely attaching the plastic part 21 to the guide 14 cooperating snapping members (generally indicated by 31) may be provided.

Further, in the embodiment according to FIG. 6, the plastic part 21 is provided with living hinges 32 allowing to manufacture the plastic part 32 in a substantially flat configuration (and folding it to the configuration shown when assembling it with the guide 14).

FIG. 7 illustrates an embodiment in which not a single plastic part, but two separate plastic parts 33,34 respectively are attached to the upper and lower guide legs 18,19. Specifically, the guide bottom 20 connecting the guide legs 18,19 is provided with two recesses 35 for receiving each a first (inner) end of a corresponding one of the two separate plastic parts 33,34. In correspondence with the embodiment of FIG. 6 an opposite second (outer) end of each plastic part 18,19 is provided with a bent end 29 for enclosing the free end 30 of the corresponding guide leg 18,19 remote from the guide bottom 20. Between the first (inner) ends of the plastic parts 33,34 and the bottom (in the figure the leftmost end) of the recesses 35 a free space 36 is provided.

In FIG. 8 the plastic part 37 defines a member only provided at and connected to a free end 30 of the upper guide leg 18. It may be attached thereto by means of a 2K molding process or any other appropriate means (such as, for example, cooperating snapping members 31 as illustrated in FIG. 6). A guide locking member 38 provided on this plastic part 37 defines a flexible lip protruding into the guide channel 24 for defining an entrance opening into the guide channel 24, and is capable of bending in an inward or outward direction of the guide channel 24 to a position with enlarged entrance opening. As a result an inwardly folded part 23 of the sunscreen is safely kept in the guide channel 24, whereas an enlarged member (for example a positioning member 16 illustrated here in broken lines) may pass by pushing the flexible lip 38 (for example inwardly and upwardly). Such a positioning member 16 may have guide edges (described below with respect to FIGS. 13 and 14) acting as a lead-in for engaging and moving the flexible lip 38 of the plastic part 37 for temporarily enlarging the entrance opening (as defined between the lowermost tip of the flexible lip 38 and the upper surface of the lower guide leg 19) of the guide channel 24 during passage of the positioning member 16.

In the embodiments illustrated in FIGS. 4-7 the lower guide leg 18 is provided with a depression 40 (for example for guiding the positioning member 16), the shape of which is followed by the plastic part 21 or 34. In the embodiment of FIG. 8 it has been indicated that such a depression 40' also may be dispensed with.

The flexible lip 38 also may be provided in any of the embodiments according to FIGS. 4-7, taking the place of the ridge or projection 22.

FIG. 9 shows an embodiment of the guide 14 in which it is combined with (or is an integral part of) another (main) guide 41 (which for example also may be an upper guide 13 as illustrated in FIG. 2) for guiding any mechanism part 42 (which for example may be a drive member 10 as illustrated in FIG. 2). In this embodiment a plastic part 37 in accordance with FIG. 8 is used, but also a plastic part in accordance with any other embodiment described may be used.

FIGS. 10 and 11 relate to a specific embodiment in which the upper guide leg 18 is shorter than the opposite lower guide leg 19 and wherein the plastic part 43 is positioned in front of a free end 49 of the upper guide leg 18 for defining an entrance opening 44 into the guide channel 24 (between its lowermost tip and the lower guide leg 19). The plastic part 43 is movable in a direction substantially perpendicular to said upper guide leg 18 for enlarging the entrance opening 44 (as illustrated in position 43') for enabling an enlarged member (such as positioning member 16) to pass, and is biased by a spring member 45 in a direction for decreasing the entrance opening (thus towards the lower guide leg 19).

As illustrated in FIG. 11, such a movable plastic part 43 may be received in a recess 46 in a seal member 47 (that, for example, may cooperate with panel 3) positioned alongside, or (as illustrated here) attached to the guide 14 through integrated guide 41 or 13. The position of the movable plastic part 43 (especially its lowermost position) may be adjustable.

Figure 12:
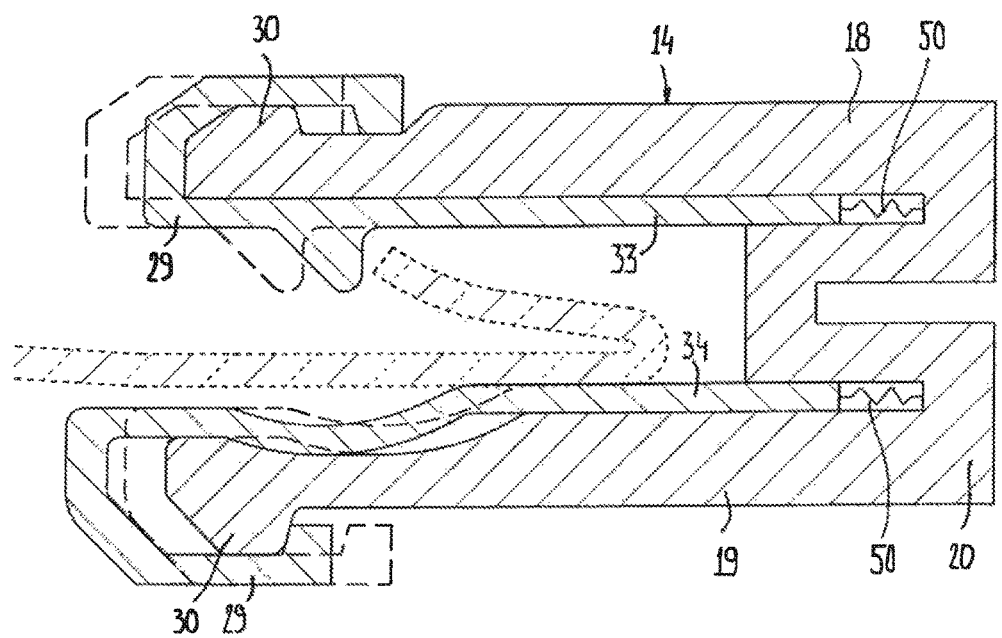

FIG. 12 illustrates an embodiment (which has some resemblance with the embodiment of FIG. 7) wherein the two separate parts 33,34 now are attached to the respective guide legs 18,19 in a manner to be movable in parallel and relative thereto against the bias of biasing members 50. This allows the passage of a positioning member 16 (not illustrated) or other part with larger dimensions than the sunscreen 4 by moving at least one of the parts 33,34 to a position as illustrated in broken lines. Of course, the shapes and dimensions of the cooperating sections of the parts 33,34 (for example shaped or bent ends thereof) and of the guide legs 18,19 (for example the ends 30 thereof remote from the guide bottom 20) must be such that such relative movements are possible.

In FIG. 13A a top plan view of a positioning member 16 in a guide 14 is illustrated schematically. In FIG. 13B a cross section (according to B-B in FIG. 13A) through the guide 14 with positioning member 16 is illustrated. A single movable plastic part 51 (biased by biasing member 50) is provided and the positioning member 16 comprises guide edges 16' for cooperation with a projection 22 of the part 51 when moving in the guide 14 (compare moved position 22 in full lines of the projection and not disturbed position 22' in broken lines). Thus the positioning member 16 may pass and after its passage the projection 22 returns to its starting position for safely keeping the sunscreen 4 with its edge in the guide 14.

Likewise in FIG. 14A a top plan view of a positioning member 16 in a guide 14 is illustrated schematically. In FIG. 14C a cross section (according to C-C in FIG. 14A) through the guide 14 with positioning member 16 is illustrated. A part 52 is provided having a flexible lip 53 for cooperation with inwardly folded part 23 of sunscreen 4. As best visible in the side elevational view of FIG. 14B (showing a view according to arrow b in FIG. 14A) the positioning member 16 comprises guide edges 16' for cooperation with flexible lip 53 when moving in the guide 14. Thus the positioning member 16 may pass and after its passage the flexible lip 53 returns to its starting position for safely keeping the sunscreen 4 with its edge in the guide 14.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A guide intended for use in a sunshade assembly, comprising:
   a flexible sunscreen having opposed longitudinal edges; and
   two opposed longitudinal guides each comprising at least two spaced guide legs for defining there between a guide channel for receiving therein and guiding corresponding ones of the opposed longitudinal edges of the flexible sunscreen, wherein the guide legs are connected by a guide bottom, each guide leg extending from a side of the guide bottom;
   wherein the guides and longitudinal edges are provided with cooperating guide locking members and edge locking members, respectively, for preventing the longitudinal edges of the flexible sunscreen from moving out of the guide channels,
   wherein the guide locking members are defined on single separate inserts directly engaging the guides, wherein each insert comprises an insert bottom adjacent the guide bottom and two insert legs, each insert leg extending from a side of the insert bottom, the insert legs extending along their respective guide legs and the insert bottom extending along the guide bottom; and
   wherein each separate insert in its entirety is spaced from the guide bottom forming a bottom spacing and at least partially is spaced from the guide legs forming respective guide leg spacings, wherein each insert leg is connected to its respective guide leg only at an end of the guide leg remote from the guide bottom, wherein the guide leg spacings and the bottom spacing are continuous and communicating with each other.

2. The guide according to claim 1, wherein each separate insert is positioned primarily between the guide legs.

3. The guide according to claim 1, wherein at least one of the guide legs at its free end is provided with a protrusion for engagingly locking the separate insert in the guide.

4. The guide according to claim 3, wherein both guide legs are provided with a protrusion.

5. The guide according to claim 1, wherein the guide is provided attached to, or integrated into an open roof construction for a vehicle.

6. The guide according to claim 1, wherein at least one of the single separate inserts is made of plastic.

7. The guide according to claim 1, wherein each separate insert is a unitary part.

8. A guide for use in a sunshade assembly, comprising:
   a flexible sunscreen having opposed longitudinal edges;
   two opposed longitudinal guides each comprising at least two spaced guide legs connected by a guide bottom, the spaced guide legs and guide bottom defining there between a guide channel for receiving therein and guiding corresponding ones of the opposed longitudinal edges of the flexible sunscreen;
   guide locking members separate from and coupled to the longitudinal guides at ends of the guide legs remote from the guide bottom, wherein each guide locking member comprises an insert having an insert bottom and two insert legs, each insert leg extending from a side of the insert bottom, the insert legs extending along their respective guide legs and the insert bottom extending adjacent to and along the guide bottom; and
   each guide locking member in its entirety spaced apart from its longitudinal guide at the guide bottom forming a bottom spacing and for at least a portion of each guide leg adjacent the guide bottom forming respective guide leg spacings, wherein the guide leg spacings and the bottom spacing are continuous and communicating with each other; and edge locking members on the longitudinal edges, the guide locking members engaging the edge locking members and configured to prevent the longitudinal edges of the flexible sunscreen from moving out of the guide channels.

9. The guide according to claim 8, wherein each guide locking member is connected to the guide legs only at ends of the guide legs remote from the guide bottom.

10. The guide according to claim 8, wherein each guide locking member is a single part.

11. The guide according to claim 8, wherein a space defined by a spaced apart section of each guide locking member and the guide is a continuous space.

12. A guide intended for use in a sunshade assembly, comprising:

a sunscreen having opposed longitudinal edges;

two opposed longitudinal guides each comprising at least two spaced guide legs connected by a guide bottom, the spaced guide legs and guide bottom defining there between a guide channel for receiving therein and guiding corresponding ones of the opposed longitudinal edges of the sunscreen; and cooperating guide locking members on the longitudinal guides and edge locking members on the longitudinal edges for preventing the longitudinal edges of the sunscreen from moving out of the guide channels, each guide locking member comprising an insert having an insert bottom spaced apart from its longitudinal guide by a bottom spacing, and two insert legs, each insert leg extending from a side of the insert bottom and spaced apart from its longitudinal guide by a guide leg spacing, the insert legs extending along their respective guide legs and the insert bottom extending along the guide bottom, each insert comprising a single separate part directly engaging its respective guide, wherein each insert is positioned primarily between the guide legs, and wherein the guide leg spacings and the bottom spacing are continuous and communicating with each other.

13. The guide according to claim 12, wherein each insert is spaced apart from the guide legs along at least a portion thereof.

14. The guide according to claim 13, wherein each insert is connected to the guide legs only at ends of the guide legs remote from the guide bottom.

15. The guide according to claim 14, wherein each insert is spaced apart from its longitudinal guide at the guide bottom.

16. The guide according to claim 15, wherein a space defined by a spaced apart section of each guide locking member and the guide is a continuous space.

\* \* \* \* \*